No. 702,384. Patented June 10, 1902.
L. VAN COTT & J. D. KEILEY.
BRAKE MECHANISM.
(Application filed May 18, 1901.)
(No Model.) 2 Sheets—Sheet 1.

No. 702,384. Patented June 10, 1902.
L. VAN COTT & J. D. KEILEY.
BRAKE MECHANISM.
(Application filed May 18, 1901.)
(No Model.) 2 Sheets—Sheet 2.

UNITED STATES PATENT OFFICE.

LINCOLN VAN COTT AND JOHN D. KEILEY, OF NEW YORK, N. Y.

BRAKE MECHANISM.

SPECIFICATION forming part of Letters Patent No. 702,384, dated June 10, 1902.

Application filed May 18, 1901. Serial No. 60,832. (No model.)

*To all whom it may concern:*

Be it known that we, LINCOLN VAN COTT and JOHN D. KEILEY, citizens of the United States, and residents of New York, county of Kings, and State of New York, have invented certain new and useful Improvements in Brake Mechanisms, fully described and represented in the following specification and the accompanying drawings, forming a part of the same.

This invention relates to certain improvements in brake mechanisms.

The heavy and rapidly-driven tram-cars now in ordinary use require exceedingly efficient and powerful brake mechanisms, especially when it is desired to make emergency stops for the purpose of preventing accidents or for other reasons. Comparative tests of the practical workings of various forms of brake mechanisms have demonstrated that a brake operating upon the track on which the car runs (such a brake being ordinarily known in the art as a "track-brake") is very efficient in action. Track-brakes as now used, however, are set by hand-actuated mechanism, which is operated by the motorman. Some little time elapses, therefore, between the beginning of the operation of setting the brakes and the time when the brakes are in full operation, and this time is frequently too long and the available power insufficient, especially when an emergency arises, to bring the car to a stop with sufficient quickness for the purpose of preventing an accident or for other reasons.

It is the object of this invention to produce an improved brake mechanism in which a track-brake is employed, the brake being set through mechanism operated from the wheels of the vehicle, thereby enabling the brake to be more quickly and powerfully set.

With this and other objects in view the invention consists in certain constructions and in certain parts, improvements, and combinations, as will be fully described and then specifically pointed out in the claims hereunto appended.

Figure 1:
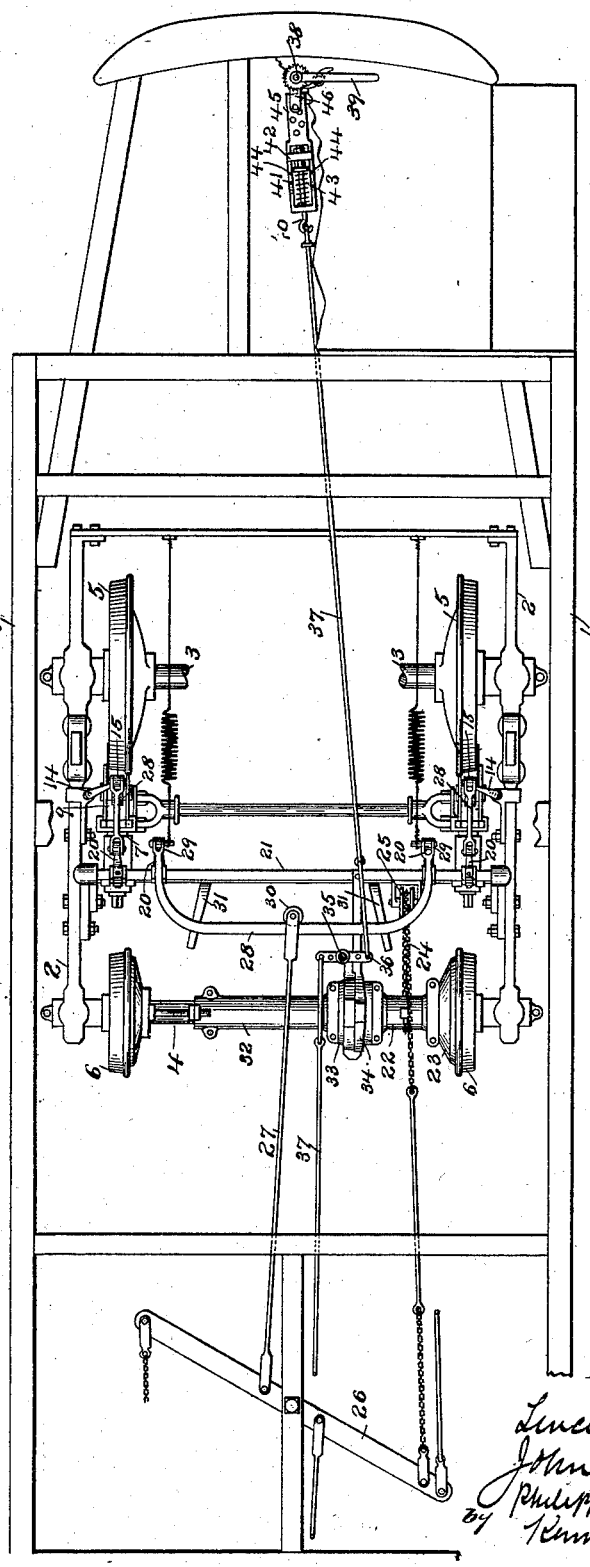
Figure 2:
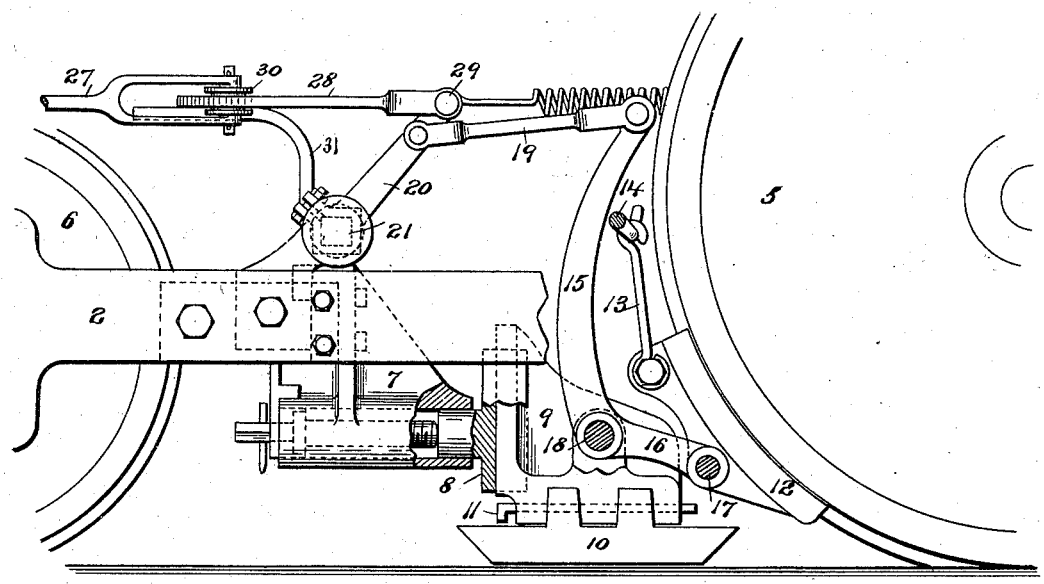

In the accompanying drawings, which form a part of this specification, and in which like characters of reference indicate the same parts, Figure 1 is a plan view of a brake mechanism constructed in accordance with the invention. Fig. 2 is a detail side elevation of the part of the construction shown in Fig. 1.

Referring to the drawings, 1 indicates a part of a car-frame, which may be of any usual or desired construction. The truck-frame is indicated at 2. This truck-frame is supported by a front axle 3 and a rear axle 4. Said axles in turn are supported by the usual wheels 5 6. The brake mechanism employed will include shoes operating upon the track on which the vehicle moves and will also preferably include shoes which act upon the wheels of the vehicle.

The mechanism for supporting and operating the track-brake shoes and the wheel-shoes may be varied in construction. In the construction chosen to illustrate the invention the truck-frame is provided with brackets 7, in which are mounted guides 8. These guides serve to control the movement of sliding blocks 9, to which the track-brake shoes 10 are secured in any suitable manner—as, for instance, by keys 11. As shown, the blocks are provided with recesses into which projections from the shoes extend, said projections and the blocks having registering perforations through which the keys pass. In the present construction, which is the preferred form, shoes are also employed for acting upon the wheels, these shoes being indicated at 12. The two sets of shoes 10 and 12 are preferably operated by the same means and preferably practically simultaneously.

The construction by which the shoes are operated may be varied within wide limits. In the construction shown the shoes 12 are supported by means of links 13 on suitable hooks or supports 14, secured to the truck-frame.
Bent levers 15 16 are pivoted to the shoes 12 at 17 and to the blocks 9, which carry the shoes 10, at 18. It is apparent that by rocking these levers 15 16 in one direction the shoes 12 will first be thrown against the wheels, the bent levers turning on the pivots 18 as fulcra, and as soon as the shoes 12 come in contact with the wheels the pivots 17 act as fulcra and the shoes 10 are thrown down against the track. The arms 15 of the levers 15 16 are connected by links 19 to arms 20, which are mounted on a squared shaft 21, extending across the truck. It is apparent, therefore, that by rocking the shaft 21 the desired movements of the levers 15 16 will be produced.

The mechanism by which the rocking movement of the shaft 21 is produced will be primarily operated from the wheels of the vehicle. While this mechanism may be varied within wide limits, in the construction shown the axle 4 of the truck is provided with a sleeve 22, which has secured to it a friction plate or disk 23, said plate or disk being adapted to be forced against one of the wheels 6. The sleeve 22 has connected to it a chain 24, which passes over a sheave 25, suitably mounted on a cross-bar of the car-frame, and is then led back to a sway-lever 26, pivoted to the car-frame. This sway-lever is connected by means of a link 27 to a bent connecting-bar 28, the ends of which are joined at 29 to the levers 20, before referred to as mounted on the shafts 21. The outer end of the link 27 is preferably slotted to embrace the bar 28, as shown, and is provided with an antifriction-wheel 30, this construction permitting the link to travel on the bar, as required. The bar 28 is preferably supported by brackets 31, which are connected to the truck-frame. It is obvious that when the sleeve 22 is moved so as to throw the friction-disk 23 against the wheel 6 the sleeve will be rotated, the sway-lever 26 operated, and the brake mechanism thrown into action.

The means by which the friction mechanism is operated may be varied within wide limits; but it will preferably be operated by devices which are controlled by the motorman. The devices shown for this purpose are the substantial counterparts of those described in the patent to John D. Keiley, dated July 9, 1901, No. 678,298, and reference is made to said patent for a full description and illustration of them. For the purposes of this application, therefore, it is sufficient to say that the axle 4 carries a second sleeve 32, which carries a disk 33, located alongside a disk 34, carried by the sleeve 22. The sleeve 32 is held against longitudinal movement, and a vertical shaft 35 is provided, which controls devices (not shown, because they have no particular reference to the present invention) by which the disks 33 and 34 are forced apart, the sleeve 22 thus being given an endwise movement on the axle to move the disk or plate 23 against the wheel. The shaft 35 carries a lever 36, said lever being connected to a brake-applying mechanism of the usual type, mounted on the front platform of the car.

The means by which the lever 36 of the friction mechanism is connected to the brake-applying device may be varied in form. Preferably, however, these means will include a yielding connection the parts of which are under tension, so that the line of connections between the brake-applying device and the lever 36 is always kept taut, said parts having a limited movement with respect to each other. The device employed will preferably be that described in the application to John D. Keiley above referred to. In the construction shown the lever 36 has connected to it links 37, one of said links being connected to a stem 40, which slides through an opening in a stirrup-block 41 and has connected to its end a cross-head 42. The stem is surrounded by a spring 43, which bears against the cross-head and the end of the stirrup-block, this spring being so arranged as to be maintained under tension. The stirrup-block 41 is further provided with shoulders 44, which limit the movement of the cross-head. The stirrup-block is connected to or formed in one piece with a perforated plate 45, said plate being connected to an arm 46 on the usual vertical brake-shaft 38, on which is mounted a handle 39. The purpose of this yielding connection is to permit the motorman when he desires to make an ordinary stop to operate the friction mechanism through a line of power-transmitting connections which include the spring, thereby bringing the car to a gradual and easy stop. When, however, the motorman desires to make an emergency stop, the brake-handle is operated to such a degree as to cause the cross-head to immediately abut against the limiting-shoulders 44, upon which the line of connections to the friction mechanism becomes rigid.

It will be understood that the brake mechanism which has been described will be duplicated for the other truck on the car, and to this end the lever 36 is connected by means of links 37 to a similar mechanism (not shown) on the other truck. (Also not shown.)

The operation of the construction will be apparent from the description before given. The motorman by operating the handle of his brake-controller actuates the friction mechanism, which in turn, through the connections described, throws the track-brake and the wheel-brake when the same is employed into instant operation. It has been found by practical test that by thus setting the track-brake from a mechanism actuated by the wheels of the car a very considerable saving in time is effected as compared with the old form of such brake constructions, in which the track-brakes are set by the motorman. An exceedingly efficient construction is thus produced and one which is of great value where emergency stops to avoid accident are required.

While the construction has been described in connection with a tram-car, it is to be understood that it may be used on other vehicles. While, furthermore, the construction shown for carrying the invention into effect is a preferred form, it is to be understood that the invention is not to be limited to the specific details thereof, as these may be varied within wide limits.

What is claimed is—

1. The combination with a vehicle, of a track-brake, a wheel-brake, mechanism actuated from the vehicle-wheels for setting said brakes, said mechanism including a single line of connections by which both brakes are operated, and means for throwing the setting mechanism into and out of action, substantially as described.

2. The combination with a vehicle of a set of track-brake shoes, a set of wheel-brake shoes, connections between the two sets of shoes whereby as the brakes are applied one set of shoes acts as a fulcrum for the other set of shoes, mechanism actuated from the vehicle-wheels for setting said brakes said mechanism including a single line of connections through which both brakes are operated, and means for throwing the setting mechanism into and out of action, substantially as described.

3. The combination with a vehicle, of a track-brake, a wheel-brake, friction mechanism actuated from the vehicle-wheels for setting said brakes, said mechanism including a single line of connections by which both brakes are operated, and means for throwing the friction mechanism into and out of action, substantially as described.

4. The combination with a vehicle, of a set of track-brake shoes, a set of wheel-brake shoes, connections between the two sets of shoes whereby as the brakes are applied one set of shoes acts as a fulcrum for the other set of shoes, friction mechanism actuated from the vehicle-wheels for setting said brakes, said mechanism including a single line of connections through which both brakes are operated, and means for throwing the friction mechanism into and out of action, substantially as described.

5. The combination with a vehicle, of a track-brake, a wheel-brake, a friction mechanism actuated from the vehicle-wheels for setting the brakes, said mechanism including a single line of connections whereby the brakes are operated, and hand-controlled means for throwing the friction mechanism into and out of action, substantially as described.

6. The combination with a vehicle, of a track-brake, a friction mechanism actuated from the vehicle-wheels for setting the track-brake, hand-controlled means for throwing the friction mechanism into and out of action, and connections between the hand-controlled means and the friction mechanism, said connections including a yielding device, the parts of which have a limited movement with respect to each other and are maintained under tension, substantially as described.

7. The combination with a vehicle, of a track-brake, a wheel-brake, friction mechanism actuated from the vehicle-wheels for setting said brakes, hand-controlled means for throwing the friction mechanism into and out of action, and connections between the hand-controlled means and the friction mechanism, said connections including a yielding device, the parts of which have a limited movement with respect to each other and are maintained under tension, substantially as described.

8. The combination with a vehicle, of a track-brake, a friction mechanism actuated from the vehicle-wheels for setting said brake, hand-controlled means for throwing the friction mechanism into and out of action, connecting means between said hand-controlled means and said friction mechanism, and a connection including a spring maintained under tension and the parts of which have a limited movement with relation to each other located in said connecting means, substantially as described.

9. The combination with a vehicle, of a track-brake, a wheel-brake, a friction mechanism actuated from the vehicle-wheels for setting said brakes, hand-controlled means for throwing the friction mechanism into and out of action, connecting means between said hand-controlled means and said friction mechanism, and a connection including a spring maintained under tension and the parts of which have a limited movement with relation to each other located in said connecting means, substantially as described.

10. The combination with a vehicle, of a set of brake-shoes operating upon the track on which the vehicle runs, a set of brake-shoes operating on the wheels of the vehicle, a friction mechanism actuated from the vehicle-wheels, hand-operated connections for throwing the friction mechanism into operation, and a single line of setting connections between the friction mechanism and the sets of brake-shoes, substantially as described.

11. The combination with a vehicle, of a set of brake-shoes operating upon the track upon which the vehicle runs, a set of brake-shoes operating upon the wheels of the vehicle, connections between the sets of shoes whereby one set acts as a fulcrum for the other set, a friction mechanism actuated from the vehicle-wheels, hand-operated connections for throwing the friction mechanism into operation and a single line of setting connections between the friction mechanism and the sets of brake-shoes, substantially as described.

12. The combination with a vehicle, of a pair of brake-shoes operating upon the track on which the vehicle runs, a pair of brake-shoes operating upon the wheels of the vehicle, a pair of bell-crank levers, each of said levers operating a track-brake shoe and a wheel-shoe, a shaft to which the bell-crank levers are connected, a sway-lever, connections between said lever and the shaft, a friction-plate mounted on one of the axles of the truck of the vehicle, and hand-operated connections by which the friction-plate is thrown into action and the brakes set, substantially as described.

In testimony whereof we have hereunto set our hands in the presence of two subscribing witnesses.

LINCOLN VAN COTT.
    JOHN D. KEILEY.

Witnesses:
 MARTIN WETBECK,
 ROBT. J. WILSON.